US006648357B2

United States Patent
Hotch

(10) Patent No.: US 6,648,357 B2
(45) Date of Patent: Nov. 18, 2003

(54) VEHICLE KICKSTANDS AND FOOT PEGS

(76) Inventor: Matthew Jon Hotch, 124 1/2 N. Princeton Ave., Fullerton, CA (US) 92831

( * ) Notice: Subject to any disclaimer, the term of this patent is extended or adjusted under 35 U.S.C. 154(b) by 0 days.

(21) Appl. No.: 09/903,969

(22) Filed: Jul. 11, 2001

(65) Prior Publication Data

US 2003/0001360 A1 Jan. 2, 2003

(51) Int. Cl.[7] ............................................. B62H 1/02
(52) U.S. Cl. .................. 280/301; 280/291; 280/293; 280/763.1; 403/93
(58) Field of Search ............................ 280/288.4, 291, 280/293, 298, 301, 763.1; 403/93

(56) References Cited

U.S. PATENT DOCUMENTS

| | | | | |
|---|---|---|---|---|
| 518,698 A | * | 4/1894 | Guiher ........................ 280/301 |
| 530,726 A | * | 12/1894 | Burke et al. ................ 280/301 |
| 626,239 A | * | 6/1899 | Lindstrom .................. 280/301 |
| 3,712,640 A | * | 1/1973 | Shipman et al. ............ 280/301 |
| 4,241,933 A | * | 12/1980 | Gratza et al. ............... 180/219 |
| 4,270,798 A | * | 6/1981 | Harder, Jr. ............. 297/411.31 |
| 4,417,746 A | * | 11/1983 | Baron ......................... 280/301 |
| 4,494,764 A | * | 1/1985 | Kelley ........................ 280/293 |
| 4,690,420 A | * | 9/1987 | Belka ....................... 280/304.1 |
| 5,282,395 A | * | 2/1994 | LaPointe et al. ............ 297/362 |
| 5,401,045 A | * | 3/1995 | Foerster et al. .......... 280/250.1 |
| 5,979,269 A | * | 11/1999 | Su-Chen ..................... 280/291 |
| 6,142,499 A | * | 11/2000 | Hsieh et al. ................ 180/219 |

* cited by examiner

*Primary Examiner*—Lesley D. Morris
*Assistant Examiner*—Daniel Yeagley
(74) *Attorney, Agent, or Firm*—Knobbe, Martens, Olson & Bear, LLP

(57) ABSTRACT

A detent mechanism including a ball bearing is used in a motorcycle kickstand and motorcycle foot pegs. A spring is placed in a cavity of a leg of the kickstand or a leg of the foot peg. A ball bearing is placed in contact with the spring. A bracket with two depressions is placed in contact with ball bearing, with one depression surrounding the ball bearing. The bracket is rotatably secured to the leg. When a user kicks or otherwise rotates the leg with a sufficient force, the ball bearing can move from one depression to another depression. The leg of the kickstand can be moved to a down position to support the motorcycle against the ground. The legs of the foot pegs can be moved to an out position to provide support for a motorcycle rider's feet.

13 Claims, 6 Drawing Sheets

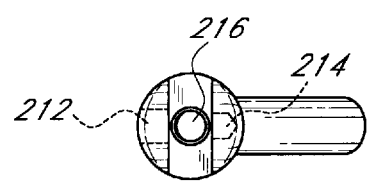
FIG. 4C
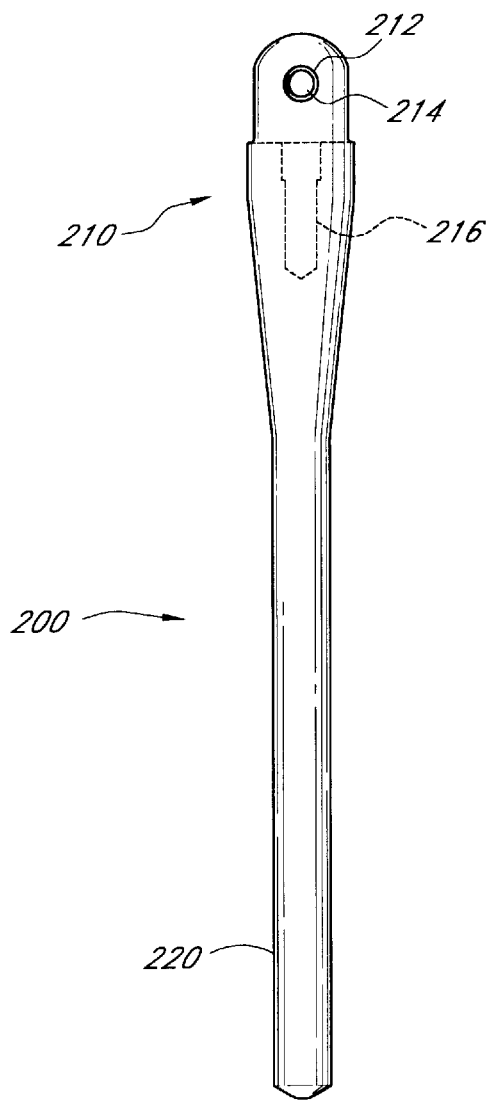
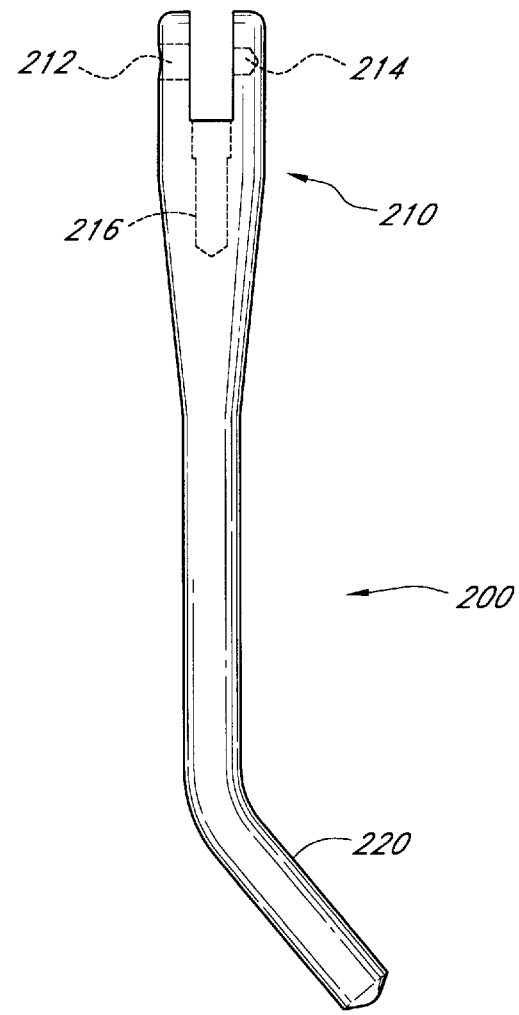
FIG. 4A  FIG. 4B

VEHICLE KICKSTANDS AND FOOT PEGS

BACKGROUND OF THE INVENTION

1. Field of the Invention

This invention relates to the field of kickstands for two wheeled vehicles and foot pegs.

2. Description of the Related Art

A kickstand is often used to support a motorcycle or other two wheeled vehicle in a substantially upright position. When a leg of the kickstand is moved to a down position, the leg contacts the ground to support the vehicle. An external spring external to the leg is often used to allow the kickstand leg to move between the down position and the up position. The down position is substantially vertical, and the up position is substantially horizontal. In some implementations, the down position is slightly past vertical. Since the kickstand is moved many times in the lifetime of the kickstand or the vehicle, the external spring is vulnerable to wear and tear. The elasticity of the external spring may be reduced. As a result, when a rider has finished riding and moves the kickstand down to support the vehicle, the kickstand may not reach or may move past the ideal support position. This is more likely to happen if the rider does not apply the right amount of force to move the kickstand from an up position to a down position. The rider may erroneously believe that the kickstand has reached the correct down position, and leave the vehicle to be supported by the kickstand at an incorrect position. Therefore the weight of the vehicle may cause it to disadvantageously fall to the ground immediately or at a later time, which can damage the vehicle or hurt individuals standing near the vehicle.

A worn external spring may also cause the kickstand to be moved to an incorrect up position. This is more likely to happen if the rider does not apply the right amount of force to move the kickstand from a down position to an up position. The kickstand at the incorrect up position may appear unsightly. The kickstand at an incorrect up position that has past horizontal level may come into contact and scratch another part of the vehicle, such as a pipe. When the rider is riding the vehicle, the kickstand at an incorrect position that has not reached horizontal level may drop into contact with the ground. This may happen due to the weight of the kickstand, due to vibration, or as a result of the rider accidentally stepping down on the kickstand. This presents a safety hazard that may cause an accident.

Foot pegs are often used to provide spaces for a rider to rest his or her feet while riding a vehicle. At riding time, a pair of foot pegs extends outward from the frame of the vehicle to an out position, to provide foot support to the rider. After riding, the rider moves the foot pegs to an in position. The in position is substantially parallel to the frame of the vehicle. Moving the foot pegs to an in position reduces the width of the vehicle, thus making the vehicle easier to be parked or stored, and less likely to scratch people passing by. The vehicle with the foot pegs at the in position may also appear more aesthetically pleasing.

SUMMARY OF THE INVENTION

The invention solves these and other problems by introducing a detent mechanism including a ball bearing in the kickstand. A detent mechanism including a ball bearing can also be used in the foot pegs.

One aspect of the invention relates to a rotatable member secured to a vehicle with at least two wheels. The rotatable member includes a mounting bracket and a leg. The mounting bracket includes a mounting portion for securing the rotatable member to the vehicle, a first depression for accommodating a ball bearing, a second depression for accommodating the ball bearing, and a ball path between the first depression and the second depression. The leg is rotatably secured to the mounting bracket. The leg includes a cavity for accommodating a spring, the spring making contact with the ball bearing.

Another aspect of the invention relates to a method of assembling a rotatable member and securing the rotatable member to a two-wheeled vehicle. The method includes placing a spring in a cavity inside a leg of the rotatable member, placing a ball bearing in contact with the spring that is placed in the cavity, placing a mounting bracket of the kickstand in contact with the ball bearing, such that a first depression of the mounting bracket partially surrounds the ball bearing, applying pressure to the spring to line up a center hole of the mounting bracket with a through hole of the leg, inserting a push screw from the through hole across the center hole, and securing the assembled rotatable member to a frame of the vehicle. The ball bearing can be moved between a resting position at the first depression and a resting position at a second depression of the mounting bracket, by a user's applying force to the leg, to move the rotatable member between a first position and a second position.

Yet another aspect of the invention relates to a kickstand for supporting a two wheeled vehicle. The kickstand includes a mounting means for mounting the kickstand to a frame of the vehicle, a detent means for providing a first resting position and a second resting position for a ball bearing placed in contact with a spring, a connecting means for connecting the mounting means to the detent means, and a support means for contacting a ground and supporting the vehicle against the ground when the kickstand is mounted to the vehicle. The support means can be moved by a user to move between a first substantially vertical position that contacts the ground when the kickstand is mounted to the vehicle, and a second position substantially parallel to the ground when the kickstand is mounted to the vehicle. The first position and the second position corresponds respectively to the first resting position and the second resting position for the ball bearing.

BRIEF DESCRIPTION OF THE DRAWINGS

FIG. 4A is a front elevational view of one embodiment of a kickstand leg.

FIG. 4B is a side elevational view of one embodiment of a kickstand leg.

FIG. 4C is a top plain view of one embodiment of a kickstand leg.

DETAILED DESCRIPTION OF THE PREFERRED EMBODIMENT

Figure 1A:
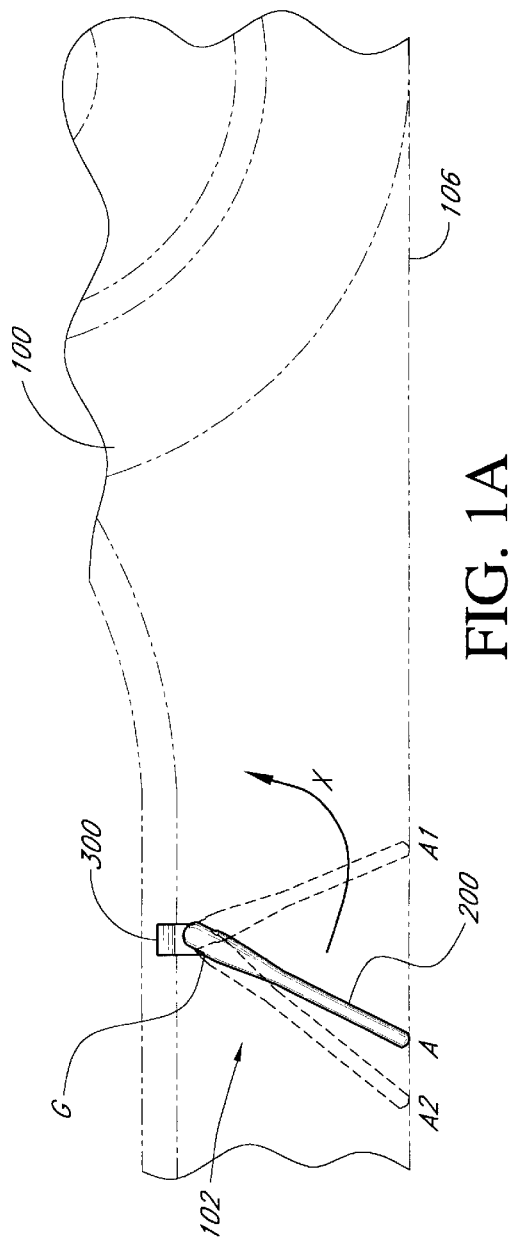
FIG. 1A is a side elevational view of one embodiment of a kickstand attached to a motorcycle, with the kickstand at a down position.

FIG. 1A is a side elevational view of one embodiment of a kickstand 102 attached to a motorcycle 100, with the kickstand 102 at a down position A. The kickstand 102 includes a leg 200 and a mounting bracket 300. As illustrated in FIG. 1A, the kickstand 102 is at a down position A to support the motorcycle 100 in a substantially upright position with respect to the ground 106. At a substantially vertical position, the kickstand 102 is able to support the motorcycle 100. The position A in FIG. 1A is slightly past vertical. At the down position A, the leg 200 of the kickstand 102 contacts the ground 106 and supports the weight of the motorcycle 100. For reasons to be described below, compared to prior art kickstands with worn external springs, the kickstand of the described embodiment is less likely to come to rest at an incorrect down position such as A1 or A2.

Figure 1B:
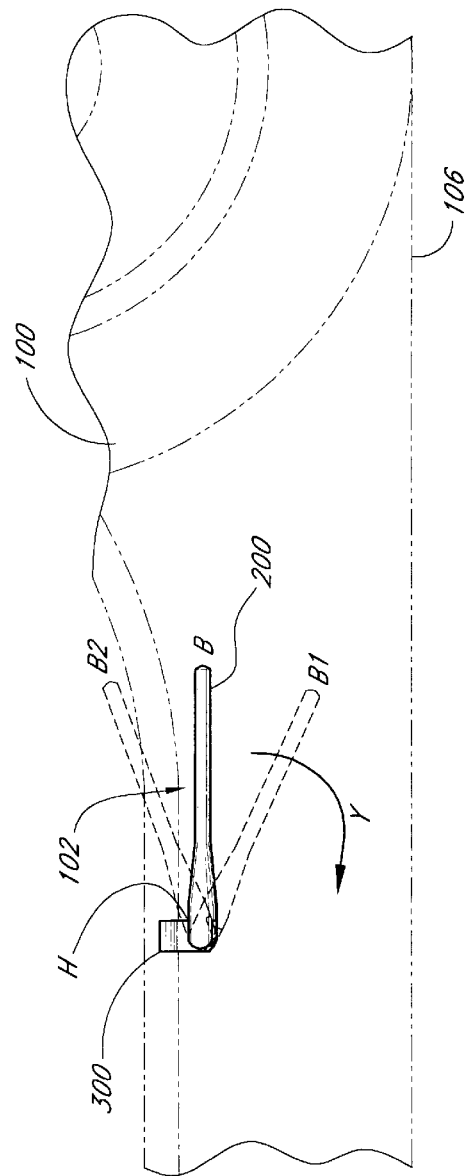
FIG. 1B is a side elevational view of one embodiment of a kickstand attached to a motorcycle, with the kickstand at an up position.

FIG. 1B is a side elevational view of one embodiment of a kickstand 102 attached to a motorcycle 100, with the kickstand 102 at an up position B. As shown in FIG. 1B, the kickstand 102 is at an up position B when the motorcycle 100 is moving. When a rider is ready to ride the motorcycle 100, the rider kicks up or otherwise rotates the leg 200 of the kickstand 102 to an up position B, so that the kickstand 102 no longer contacts the ground 106. At the up position B, the kickstand 102 is preferably substantially parallel to the ground 106. To move the kickstand 102 from the up position B to the down position A, a user applies a sufficient force on the leg 200. As shown in FIG. 1B, the leg 200 moves from the up position to the down position in the approximate direction of the arrow Y. To move the kickstand 102 from the down position A to the up position B, a user applies a sufficient force on the leg 200. As shown in FIG. 1A, the leg 200 moves from the down position to the up position in the approximate direction of the arrow X. For reasons to be described below, compared to prior art kickstands with worn external springs, the kickstand of the described embodiment is less likely to come to rest at an incorrect up position such as B1 or B2.

The kickstand 102 can be secured to the motorcycle 100 as an original component of the motorcycle 100, or as an after-market accessory to the motorcycle 100. Although it is named a "kickstand", it can also be moved by hand from one position to another. In one preferred embodiment, the kickstand 102 at the up position B is parallel to and directly below a pipe of the motorcycle 102.

In FIG. 1A, the leg 200 and the mounting bracket 300 can be designed to come into contact with each other at location G, thus preventing the leg 200 from moving past position A to position A2. In FIG. 1B, the leg 200 and the mounting bracket 300 form a substantially perpendicular intersection. The leg 200 and the mounting bracket 300 come into contact with each other at location H, thus preventing the leg 200 from moving past position B to an undesirable position B2. These and other advantages of the kickstand 102 will be described below in detail.

Figure 2A:
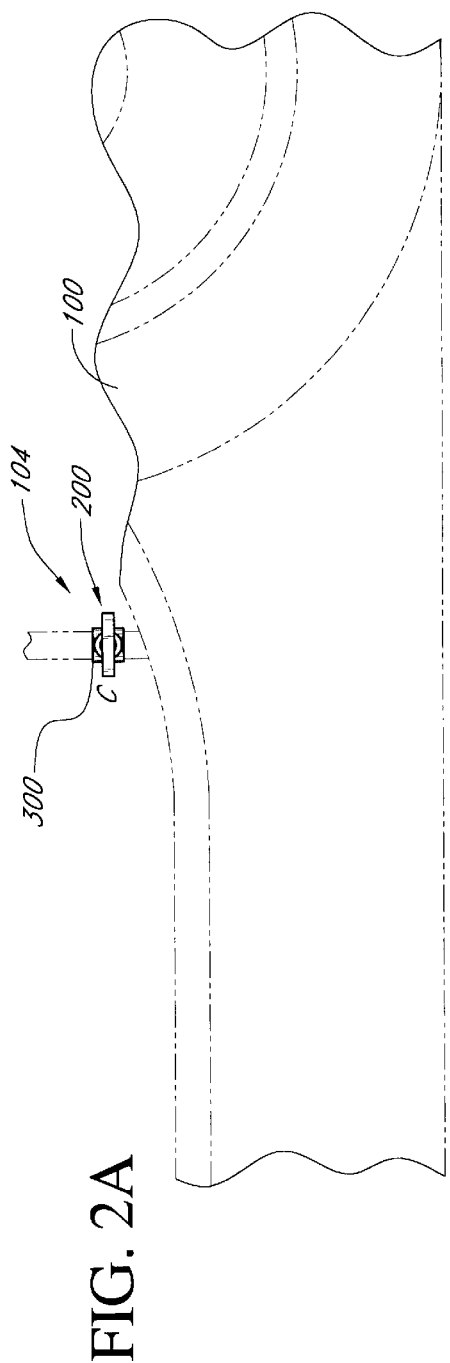
FIG. 2A is a side elevational view of one embodiment of a foot peg attached to a motorcycle, with the foot peg at an out position.

FIG. 2A is a side elevational view of one embodiment of a foot peg 104 attached to a motorcycle 100, with the foot peg 104 at an out position C. The foot peg 104 at the out position C allows a rider to rest his or her foot on the foot peg 104. The out position C extends outward from the frame of the motorcycle 100. FIG. 2A illustrates one foot peg 104 attached to one side of the motorcycle 100. Another foot peg 104 can be attached to the other side of the motorcycle 100.

Figure 2B:
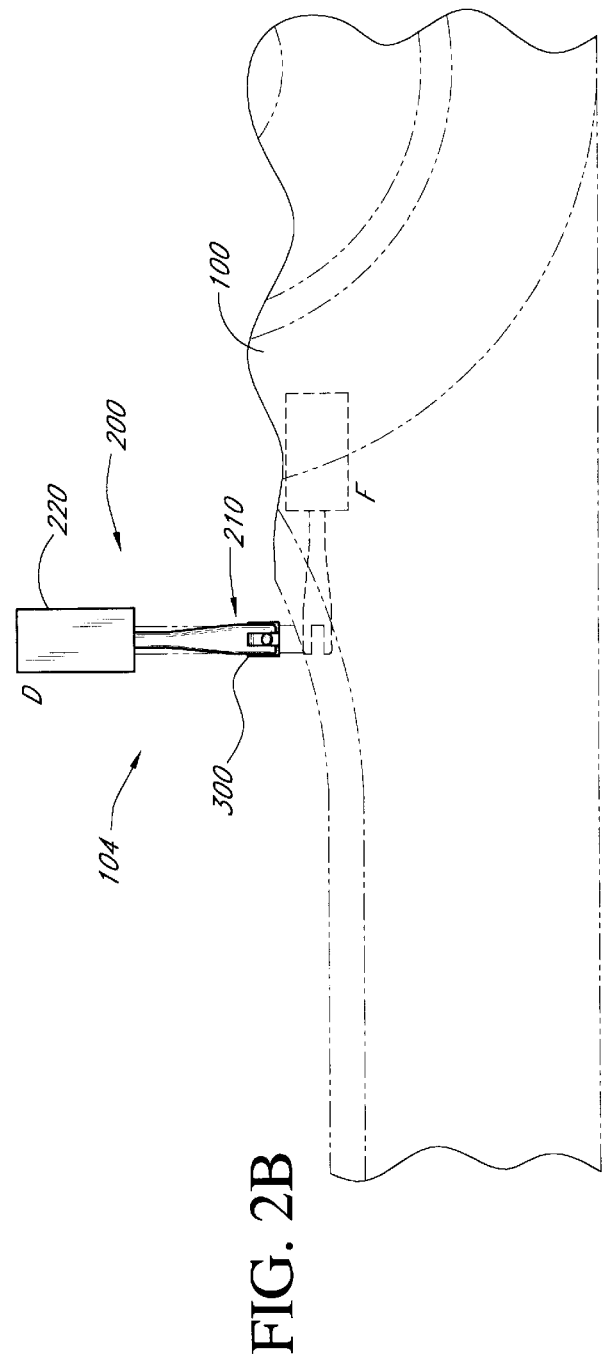
FIG. 2B is a side elevational view of one embodiment of a foot peg attached to a motorcycle, with the foot peg at an in position.

FIG. 2B is a side elevational view of one embodiment of a foot peg 104 attached to a motorcycle 100, with the foot peg 104 at an in position D. When the rider does not want to rest his or her foot on the foot peg 104, or when the motorcycle 100 is parked or stored, the rider can rotate the foot peg 104 from the out position C to the in position D. At the in position D, the foot peg 104 has been folded upward, and the foot peg 104 is substantially vertical. The foot peg 104 can be secured to the motorcycle 100 as an original component of the motorcycle 100, or as an after-market accessory to the motorcycle 100. Referring to FIG. 2B, after the rider has finished riding, the rider can kick or otherwise rotate the foot peg 104 to the in position D, which is substantially parallel to the frame of the motorcycle 100. Compared to the out position C, the in position D reduces the width of the motorcycle 100, thus making the motorcycle 100 easier to be parked or stored, and less likely to scratch people passing by. The motorcycle 100 with the foot peg 104 at the in position D may also appear more aesthetically pleasing. The foot pegs are preferably used to provide foot support for a passenger of the motorcycle 100, but can also be used to provide foot support for a driver of the motorcycle 100. Two pairs of foot pegs can be attached to a motorcycle 100, with one pair of foot pegs providing foot support to a driver and the other pair providing foot support to a passenger. The foot pegs can also be used to provide foot support for a passenger in a rear seat of a bicycle. The foot pegs can be attached to any convenient location on the frame of the vehicle, as desired by a owner of the vehicle.

The foot peg 104 includes a leg 200 and a mounting bracket 300. The leg 200 includes an upper portion 210 and a lower portion 220. The lower portion 220 of the foot peg 104 preferably has a flat surface to support a rider's foot. Alternatively, the leg 200 may be of any design or configuration as desired by the owner of the vehicle, as understood by those skilled in the art. Referring to FIG. 2B, in another embodiment, the in position of the foot peg 104 is at position F. The foot peg 104 has been folded sideways at position F, preferably towards the rear of the motorcycle 100. The position F is substantially parallel to the frame of the motorcycle 100. By arranging the orientation of mounting the mounting bracket 300 to the motorcycle 100, or arranging the orientation of attaching the leg 200 to the mounting bracket 300, the in position can be arranged to be D or F. One embodiment of the foot peg 104 is described below in connection with FIG. 6.

Figure 3:
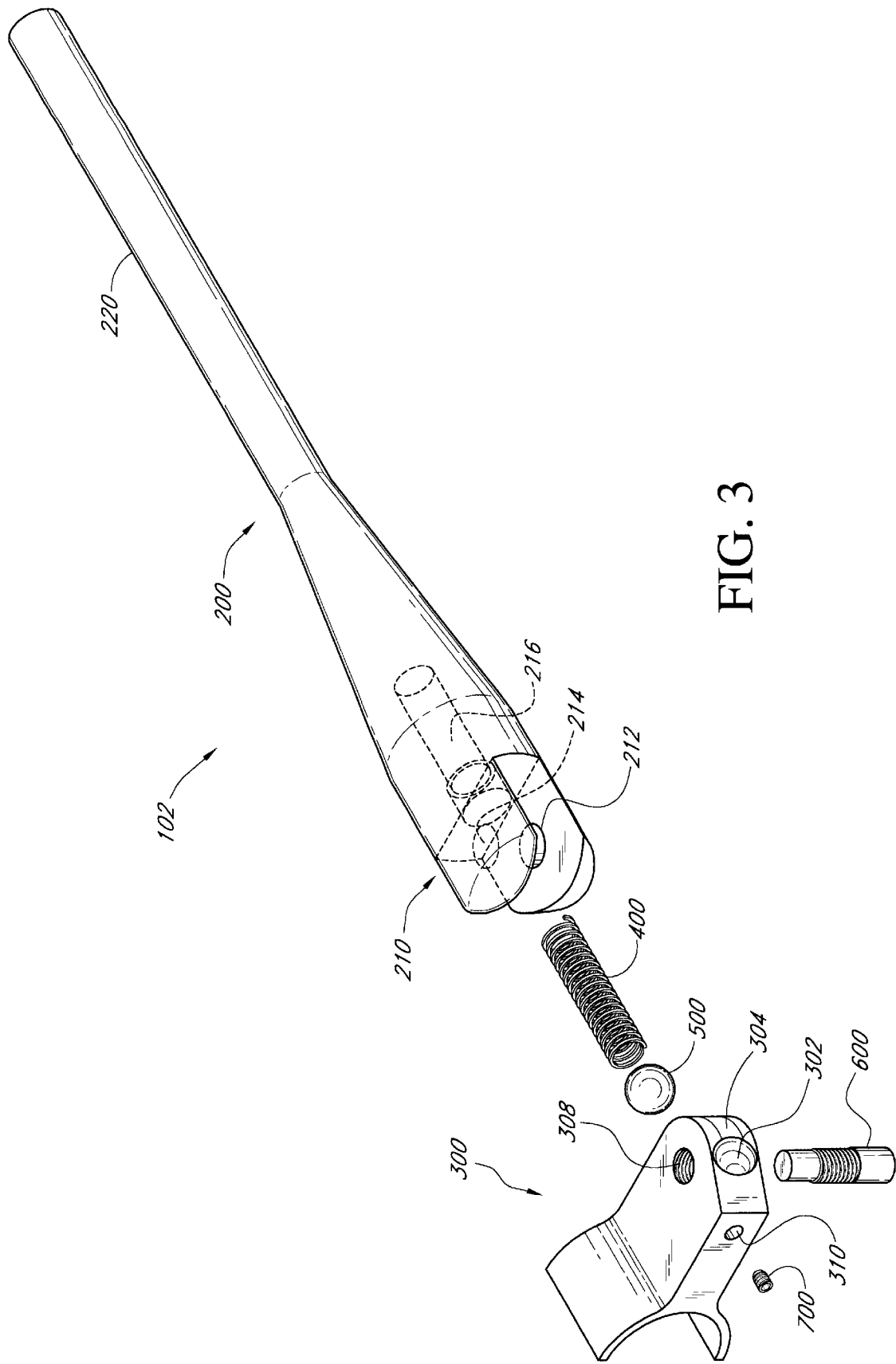
FIG. 3 is an exploded view of one embodiment of a kickstand.
Figure 5B:
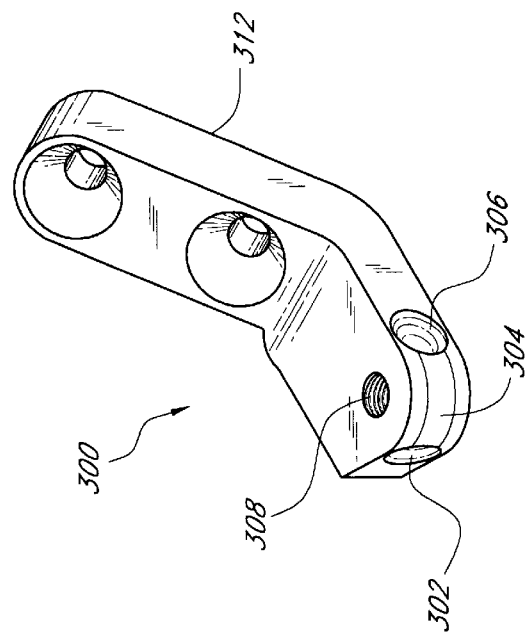
FIG. 5B is a front elevational view of one embodiment of another mounting bracket.
Figure 5C:
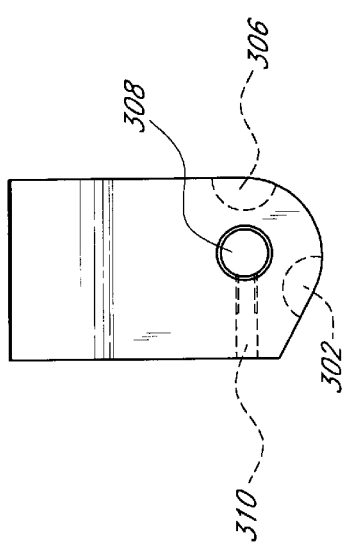
FIG. 5C is a side elevational view of one embodiment of a mounting bracket.
Figure 5A:
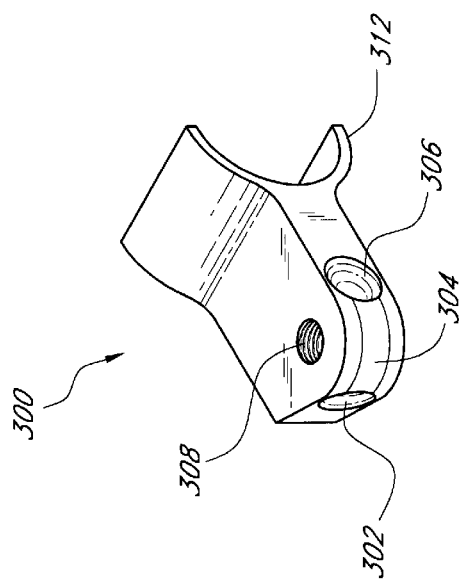
FIG. 5A is a front perspective view of one embodiment of a mounting bracket.

FIG. 3 is an exploded view of one embodiment of a kickstand 102. The kickstand 102 includes a leg 200, a mounting bracket 300, a spring 400, a ball bearing 500, a push screw 600, and a set screw 700. The leg 200 includes an upper portion 210 and a lower portion 220. The upper portion 210 includes a through hole 212, a non-through hole 214, and a cavity 216. The through hole 212 and the non-through hole 214 are located on opposite sides of the upper portion 210. The cavity 216 is located inside the upper portion 210. As will be described below in more detail, the mounting bracket 300 can be connected to the upper portion 210 of the leg 200 to form the kickstand 102. When the leg 200 is at a down position, the lower portion 220 comes into contact with the ground 106 to support the motorcycle 100. As will be described below in more detail, the leg 200 and the mounting bracket 300 can be rotatably connected using the push screw 600 and the set screw 700. The spring 400 and the ball bearing 500 can be placed inside the upper portion 210 and the mounting bracket 300, to allow the kickstand 102 to move between an up position and a down position. The mounting bracket 300 includes a first depression 302, a ball path 304, a second depression 306 (not shown), a threaded center hole 308 for accommodating the push screw 600, and a threaded side hole 310 for accommodating the set screw 700. The ball path 304 is the path between the first depression 302 and the second depression 306. The second depression 306 is shown in FIGS. 5A–5C.

Referring to FIG. 3, in one embodiment of assembling the kickstand 102, the spring 400 is placed in the cavity 216. The uncompressed length of the spring 400 is preferably greater than the depth of the cavity 216. The ball bearing 500 makes contact with the top of the spring 400 that is not buried in the cavity 216. The mounting bracket 300 is placed in contact with the ball bearing 500, with the first depression 302 surrounding the ball bearing 500. The first depression 302 partially or fully surrounds the ball bearing 500. In another embodiment of assembling the kickstand 102, the mounting bracket 300 is placed in contact with the ball bearing 500 with the second depression 306 surrounding the ball bearing 500. The spring 400 has sufficient elasticity and a sufficient diameter, to apply continuous pressure to the ball bearing 500 against the mounting bracket 300. Since the spring 400 is located inside the leg 200, the spring 400 is not exposed to external elements and is not likely to rust.

From the mounting bracket 300, a sufficient amount of pressure is applied to compress the spring 400 toward the cavity 216, until the center hole 308 of the mounting bracket 300 is lined up with the through hole 212 of the leg 200. The push screw 600 is inserted into the through hole 212 and crosses the center hole 308. After insertion, the push screw 600 preferably extends into the non-through hole 214 on the opposite side of the upper portion 210. The leg 200 is able to hinge on the push screw 600 and move between the ball bearing's resting positions in the first depression 302 and the second depression 306. The set screw 700 is then inserted into the side hole 310 and contacts the inserted push screw 600, to prevent the push screw 600 from rotating and loosening. In one embodiment, the set screw 700 is inserted into the side hole 310 using an Allen wrench. Since the set screw 700 is not visible to common observers after it is installed, it helps present a clean, aesthetically pleasing look to observers. The mounting bracket 300 is preferably secured to the motorcycle 100 in such a way that the through hole 212 faces the frame of the motorcycle 100. Therefore the push screw 600 is not visible to common observers after it is installed. Such a configuration also helps present a clean, aesthetically pleasing look to observers.

In one embodiment, instead of the non-through hole 214, the upper portion 210 includes another through hole on a side opposite the through hole 212. When the through hole 212 is lined up with the center hole 308, the push screw 600 is inserted from the through hole 212 and surfaces from the other through hole. The push screw 600 is then secured to a bolt at the other through hole, to prevent the push screw 600 from loosening.

Within the assembled kickstand 102, the ball bearing 500 can move between the first depression 302 and the second depression 306 along the ball path 304. Referring to FIG. 1A and FIG. 1B, when the ball bearing 500 is in the first depression 302, the kickstand 102 is at the correct down position A. When a rider kicks or otherwise rotates the kickstand 102 toward the up position, the ball bearing 500 is moved along the ball path 304 to the second depression 306. When the ball bearing 500 is in the second depression 306, the kickstand 102 is at the correct up position B. Once the ball 500 is in a depression 302 or 306, a sufficient amount of force is required to move the ball bearing 500 out of the depression. Therefore the kickstand 102 is not likely to move to an incorrect position, such as A1, A2, B1, or B2. As described above in connection with FIG. 1A and FIG. 1B, the leg 200 and the mounting bracket 300 can be configured to contact each other when the leg is moved to a correct position A or B, to further prevent moving past the correct position A or B. The leg 200 and the mounting bracket 300 of a foot peg 104 can also be configured to contact each other and to prevent moving past the correct position.

FIG. 4A is a front elevational view of one embodiment of a leg 200. The leg 200 includes an upper portion 210 and a lower portion 220. The upper portion 210 and the lower portion 220 are described as separate components for convenience. They preferably form one integral component. They can also be separate components connected together, for example by welding or telescopically. The upper portion 210 includes a through hole 212, a non-through hole 214, and a cavity 216.

FIG. 4B is a side elevational view of one embodiment of a leg 200. The through hole 212 and the non-through hole 214 are located on opposite sides of the upper portion 210. The cavity 216 is preferably located inside the upper portion 210. When the leg 200 is at a down position, the lower portion 220 of the leg 200 comes into contact with the ground 106 to support the motorcycle 100. As shown in FIG. 4B, the lower portion 220 of the leg 200 is bent. In another embodiment shown in FIG. 3, the lower portion 220 is straight.

The configuration of the lower portion 220 can be modified in various embodiments to provide better ground support or better styling. For example, the surface area of the tip can be expanded to provide a larger surface area that contacts the ground 106. The outer ring of the tip can also be expanded to provide a larger perimeter that contacts the ground 106. In one embodiment, the length of the leg 200 can be adjusted, for example by making the lower portion 220 telescopically connected to the upper portion 210. By adjusting the length of the leg 200, a user can adjust the leaning degree of the motorcycle 100 when it is supported by the kickstand 102. In another embodiment, the length of the leg 200 is fixed. A kickstand 102 with a leg 200 of fixed length can still be used on motorcycles 100 with varying heights. For example, to be attached to a taller motorcycle 100, the mounting bracket 300 can be attached to a part of the motorcycle 100 that is closer to the ground. In another embodiment, two identical kickstands 102 can be attached to a taller motorcycle and a shorter motorcycle, with the taller motorcycle having a greater leaning degree when supported by the kickstand 102, and the shorter motorcycle in a more upright position when supported by the kickstand 102. As will be understood by those skilled in the art, the length of the leg 200 can be modified as desired for each individual vehicle to obtain the desired leaning angle of the vehicle when the kickstand 102 is at the down position.

FIG. 4C is a top plain view of one embodiment of a leg 200.

FIG. 5A is a front perspective view of one embodiment of a mounting bracket 300. The mounting bracket 300 includes a first depression 302, a ball path 304, a second depression 306, a center hole 308 for accommodating the push screw 600, and a side hole 310 for accommodating the set screw 700. The positions of the first depression 302 and the second depression 306 affect the kickstand's up position and down position. For example, if the first depression 302 and the second depression 306 are further apart, then the up position and the down position are also further apart. If the first depression 302 and the second depression 306 are closer together, then the up position and the down position are also closer together.

The ball path 304 can be a curved surface or a flat surface, on which the ball bearing 500 moves between the first depression 302 and the second depression 306. In one embodiment, the ball path 304 is a groove. The ball bearing 500, the first depression 302, the second depression 306, and the ball path 304 are preferably made of high-quality metal or covered with a layer of hard coating to reduce wear and corrosion. Wax or adhesive can be applied on the ball path 304 to increase or reduce the ease of the ball bearing's movement, thus changing the amount of force required to move the leg 200 from one position to another position.

The mounting bracket 300 also includes a mounting portion 312. The mounting portion 312 can be secured to a vehicle through a number of ways, such as welding, using screws, using screws and bolts, using adhesives, and the like. FIG. 5A illustrates a mounting portion 312 that includes a flange to surround a pipe of the motorcycle 100.

FIG. 5B is a front elevational view of one embodiment of another mounting bracket 300. In FIG. 5B, the mounting portion 312 includes two holes to accept screws that are secured to the motorcycle 100. In one preferred embodiment, the two screws are inserted into a flange that surrounds a pipe of the motorcycle 100. The screws are then secured to the two holes in the mounting portion 312 of FIG. 5B.

FIG. 5C is a side elevational view of one embodiment of a mounting bracket 300.

The kickstand 102 can be made of metal. The kickstand 102 can also be made fully or partially of other materials, such as plastic. In another embodiment of the kickstand 102, the upper portion of the leg includes two depressions and a ball path, and the mounting bracket includes a cavity for accommodating a spring. In this embodiment, a ball bearing can be moved between the two depressions in the upper portion of the leg. The ball bearing makes contact with the spring in the mounting bracket.

Figure 6:
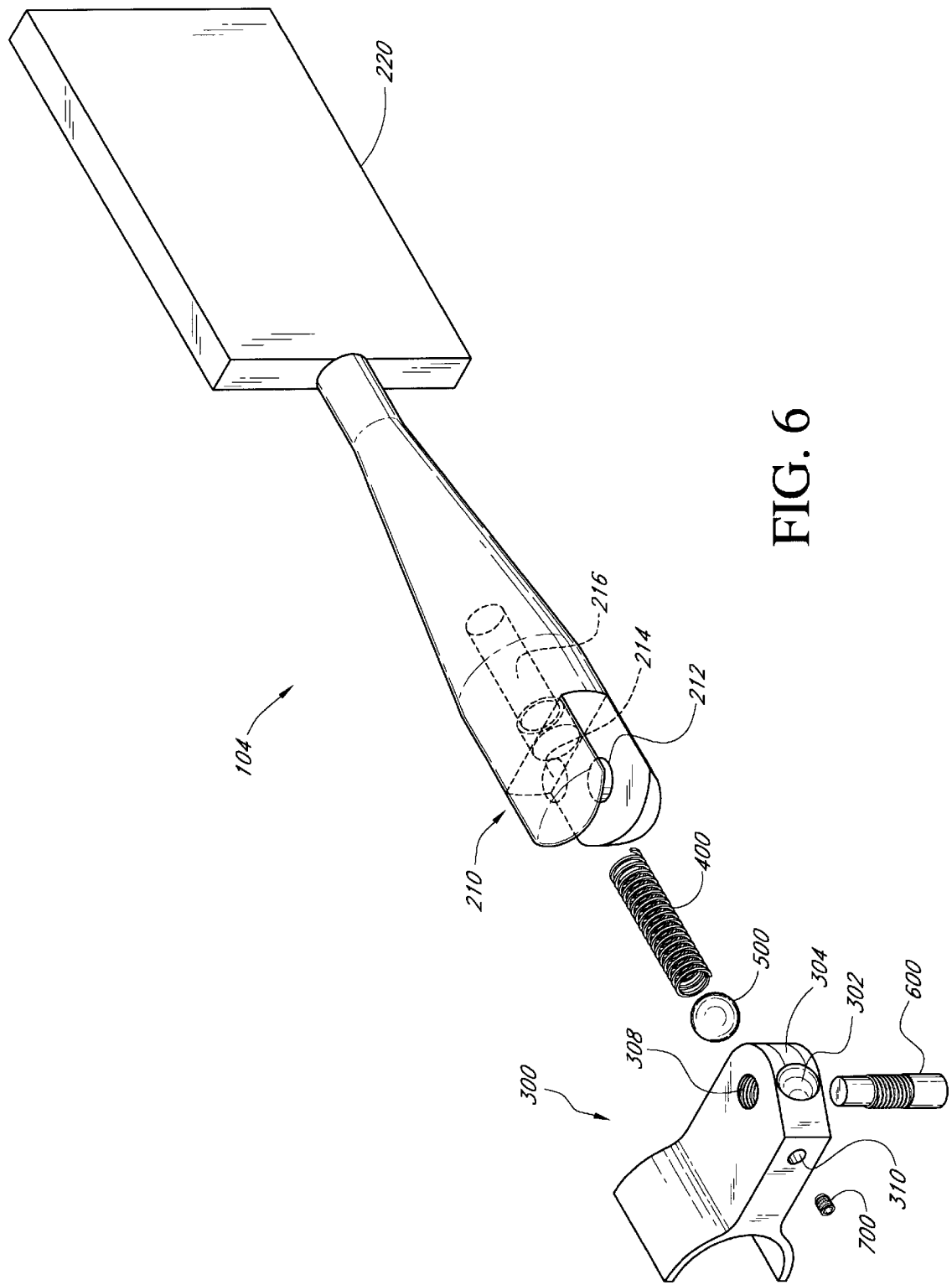
FIG. 6 is an exploded view of one embodiment of a foot peg.

FIG. 6 is an exploded view of one embodiment of a foot peg 104. The foot peg 104 includes an upper leg portion 210, a lower leg portion 220, a mounting bracket 300, a spring 400, and a ball bearing 500. The mounting bracket 300 includes a first depression 302, a ball path 304, a second depression 306 (not shown). As illustrated in FIG. 6, the lower leg portion 220 of the foot peg 104 preferably has a flat top portion with sufficient surface area to accommodate a motorcycle rider's foot. The upper leg portion 210 includes a cavity 216 for accommodating the spring 400. The ball bearing 500 is placed in contact with the spring 400. Details of placing the spring 400 and the ball bearing 500 in the upper leg portion 210 and the mounting bracket 300 have been described above in connection with the kickstand 102. Details of attaching the mounting bracket 300 to the frame of a motorcycle 100 have been described above in connection with the kickstand 102. The upper leg portion 210 and the lower leg portion 220 can form one integral component. They can also be separate components connected together.

The upper leg portion 210 and the mounting bracket 300 can be connected by a number of ways, for example by using a push screw 600 and a set screw 700, as described above in connection with the kickstand 102. The spring 400 and the ball bearing 500 can be placed inside the foot peg 104, to allow the ball bearing 500 to move along the ball path 304 between the first depression 302 and the second depression 306. Therefore the foot peg 104 can move between an out position and an in position. One preferred out position is substantially perpendicular to the frame of the motorcycle 100. One preferred in position is substantially vertical.

Although the specification has described certain embodiments, other embodiments that are apparent to those of ordinary skill in the art are also within the scope of this invention. Accordingly, the scope of the present invention is to be defined by reference to the claims below.

What is claimed is:

1. A rotatable member secured to a vehicle with at least two wheels, the rotatable member comprising:
   a mounting bracket adapted to be mounted to a motorcycle, said bracket comprising:
      a mounting portion for securing the rotatable member to the vehicle;
      a first depression for accommodating a ball bearing;
      a second depression for accommodating the ball bearing; and
      a ball path between the first depression and the second depression, and
   a leg rotatably secured to the mounting bracket, the leg comprising a cavity for accommodating a spring, the spring making contact with the ball bearing; wherein
   the mounting bracket further comprises a center hole, the leg further comprises a through hole, and the mounting bracket and the leg are rotatably secured by a push screw extending through the through hole and the center hole; and
   the mounting bracket further comprises a side hole, and a set screw within the side hole contacts the push screw to prevent the push screw from rotating.

2. The rotatable member of claim 1, wherein the leg is a foot peg which is adapted to be moved between a first position in which the leg is substantially parallel to a motorcycle frame in the first position and substantially perpendicular to the motorcycle frame in a second position.

3. The rotatable member of claim 1, wherein the rotatable member is a kickstand for the motorcycle.

4. The rotatable member of claim 1, wherein the rotatable member is a foot peg for the motorcycle.

5. The rotatable member of claim 1, wherein said ball path comprises a depressed groove which has a depth less than depths of the first and second depressions.

6. The rotatable member of claim 1, wherein the mounting portion is welded to the vehicle.

7. The rotatable member of claim 1, wherein the mounting portion is secured to the vehicle by at least two screws.

8. A rotatable member secured to a vehicle with at least two wheels, the rotatable member comprising:
   a mounting bracket comprising:
      a first depression for accommodating a ball bearing;
      a second depression for accommodating the ball bearing; and
      a ball path between the first depression and the second depression, said ball path comprising a depressed groove, and
   a leg rotatably secured to the mounting bracket by a single threaded connector which is held in place by a set screw, the leg comprising a cavity for accommodating a spring, the spring biasing the ball bearing toward the mounting bracket;

wherein the bracket is adapted to be mounted to a motorcycle, and the leg is adapted to support a motorcycle when in a first position relative to the mounting bracket.

9. The rotatable member of claim 8, wherein the mounting bracket is welded to a motorcycle.

10. A method of assembling a rotatable member and securing the rotatable member to a two-wheeled vehicle, the method comprising:

placing a spring in a cavity inside a leg of the rotatable member;

placing a ball bearing in contact with the spring;

placing a mounting bracket of the rotatable member in contact with the ball bearing, such that a first depression of the mounting bracket partially surrounds the ball bearing;

applying pressure to the spring to line up a center hole of the mounting bracket with a through hole of the leg, the through hole being on a side of the leg;

inserting a push screw through the through hole and the center hole;

securing the push screw such that the push screw is non-rotatable relative to the mounting bracket by inserting a set screw through a side hole of the bracket until the set screw contacts the push screw; and securing the assembled rotatable member to a frame of the vehicle, wherein a force applied to the leg to rotate the rotatable member between a first position and a second position moves the ball bearing between a resting position at the first depression and a resting position at a second depression of the mounting bracket.

11. The method of claim 10, wherein the vehicle is a motorcycle.

12. The method of claim 10, wherein the rotatable member is a kickstand, wherein the first position is substantially horizontal, and the second position is substantially vertical, and wherein the kickstand at the second position supports the vehicle against a ground.

13. The method of claim 10, wherein the rotatable member is a foot peg, wherein the first position extends outward from the frame of the vehicle, wherein the second position is substantially parallel to the frame of the vehicle.

* * * * *